March 3, 1959 J. R. WHITE 2,876,372

COLOR-IMAGE-REPRODUCING APPARATUS

Filed Nov. 19, 1954

2,876,372

COLOR-IMAGE-REPRODUCING APPARATUS

John R. White, Westbury, N. Y., assignor to Hazeltine Research, Inc., Chicago, Ill., a corporation of Illinois Application November 19, 1954, Serial No. 469,942

5 Claims. (Cl. 313—84)

Figure 1:
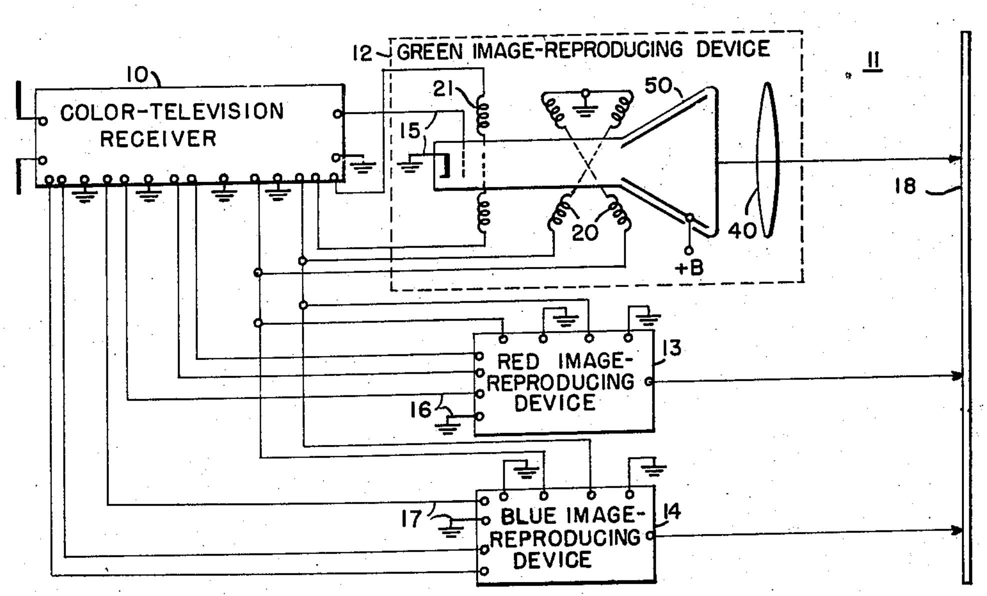

This invention relates to color-image-reproducing apparatus for color-television receivers and, more particularly, to color-image-reproducing apparatus of the projection type.

In color-television-projection receivers it is extremely important that component color images projected to a display screen from a plurality of cathode-ray tubes be maintained in exact register to reproduce a single composite multicolor image. It has heretofore been proposed to control the register of the images developed by the cathode-ray tube by adjusting the position of electromagnetic focus winding housings relative to the tubes to position the individual image rasters as desired. For some applications it may be desirable to provide a vernier adjustment of register which does not require a vernier adjustment of the position of the focus winding housings.

It is an object of the invention to provide a new and improved color-image-reproducing apparatus for a color-television receiver in which a vernier adjustment of image register is readily obtained.

In accordance with a particular form of the invention, in apparatus for displaying in register images developed by a plurality of cathode-ray tubes, an image-reproducing device comprises a cathode-ray tube having an associated magnetic cathode-ray beam-focus unit and associated beam-deflection means for developing an image on the tube face. The device also includes a pair of magnetic shunts disposed along non-opposite axes of the beam-focus unit and displaceable for adjusting the reluctance of the beam-focus unit along the axes to control the positioning of the image.

For a better understanding of the present invention, together with other and further objects thereof, reference is had to the following description taken in connection with the accompanying drawing, and its scope will be pointed out in the appended claims.

Figure 2:
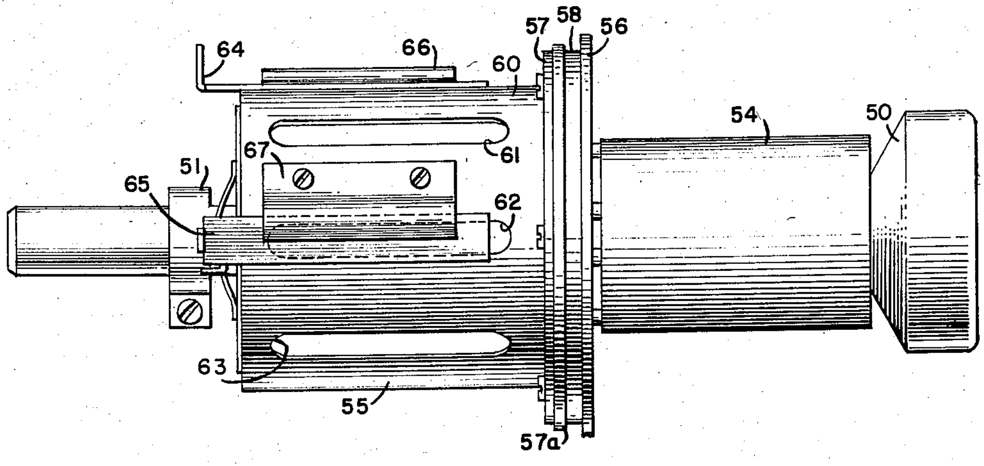

Referring to the drawing:

Fig. 1 is a diagram, partly schematic, of a color-television receiver including color-image-reproducing apparatus of the projection type constructed in accordance with the invention, and Fig. 2 is a side view of a cathode-ray tube and associated beam-focus and beam-deflection units employed in the Fig. 1 apparatus.

Referring now more particularly to Fig. 1 of the drawing, there is represented a color-television receiver 10 including conventional receiver circuits of a type more fully described in the copending application of W. F. Bailey, Serial No. 429,941, filed May 14, 1954, now United States Patent No. 2,752,419, entitled "Color-Image-Reproducing Apparatus of the Projection Type." There is associated with the receiver 10 color-image-reproducing apparatus 11 of the projection type comprising, for example, green, red, and blue image-reproducing devices 12, 13, 14, respectively, having input circuits 15, 16, 17 connected to video-frequency signal-supply circuits of the receiver 10 for supplying, for example, green, red, and blue video-frequency signals to control electrodes and cathodes of three cathode-ray image-reproducing tubes which develop, in conjunction with suitable light filters (not shown), green, red, and blue color images for projection to a display screen 18 in register.

Cathode-ray tube 50 of the green image-reproducing device 12 has the usual electrodes and beam-deflection windings 20 for causing the cathode-ray beam of the tube to scan the face thereof in a conventional manner. The device 12 also includes an electromagnetic beam-focus winding 21 housed in a unit, more fully described hereinafter, for focusing the cathode-ray beam of the tube 50. There is also provided a suitable lens or other optical system, represented for purposes of explanation by converging lens 40, for projecting the green image to the display screen in register with the other component images to form a single multicolor image. Devices 13 and 14 preferably are of similar construction to the device 12 with the exceptions that they include red and blue image-reproducing cathode-ray tubes, respectively.

Referring now more particularly to Fig. 2 of the drawing, an electromagnetic beam-focus unit 55 housing the beam-focus winding 21 is bolted to a mounting plate 56 by means of suitable screws through flange 57, an end plate 57*a* which affects the beam focus field distribution in unit 55, and a ring spacer 58. The cathode-ray tube 50 is supported at the gun end thereof by suitable clamp 51 attached to the focus unit 55. The bulb of the cathode-ray tube is supported by suitable means (not shown) within a housing 54 for the deflection windings 20.

Referring to the focus unit 55 in greater detail, the unit preferably comprises a magnetic substantially cylindrical outer shield 60 having high-reluctance paths, for example, air gaps 61, 62, 63 therein and similar other gaps not apparent in the Fig. 2 view. A pair of magnetic shunts 64, 65 are disposed along non-opposite axes of the focus unit and are displaceable for adjusting the reluctance of the beam-focus unit along the axes to control the register of the component color images. The shunts preferably are low-reluctance elements disposed along axes spaced by approximately 90° along the periphery of the focus unit. These shunts may be held in position by any means such as spring elements 66, 67. It will be understood that other shunts, for example a second pair of shunts diametrically opposed on the unit 55 to the shunts 64, 65, may be utilized, if desired to extend the range of adjustment as additional vernier controls.

During the initial adjustment of the register of the image-reproducing apparatus, the beam-focus unit 55 may be positioned on the mounting plate 56 and bolted thereto. Oversized holes in the flange 57 allow adjustment of the position of the unit 55 with respect to its end plate 57*a* and with respect to the tube 50 which is pivoted at the bulbous end thereof by its stationary support in the yoke 54. This alters the beam-focus field distribution and provides a coarse adjustment of register of the projected green image with the other projected images. The magnetic shunts 65, 66 may then be longitudinally displaced along the corresponding air gaps to provide a vernier adjustment of register. The shunts provide lower reluctance for the magnetic flux of the beam-focus unit when the shunts completely cover the air gaps. Since the shunts are disposed on different diameters along the periphery of the unit 55, they are effective to alter the beam-focus field in two dimensions. Thus, displacement of the shunt 64 in such manner as to cover its corresponding air gap causes primarily a displacement in a given direction of the image reproduced on the display screen 18 of the Fig. 1 receiver while displacement of the shunt 65 causes primarily a displacement of the reproduced image on the display screen in a direction perpendicular to the given direction.

Displacement of each shunt alters the distribution of the magnetic field within the neck of the cathode-ray tube, causing a slight displacement of the effective magnetic lens formed by the magnetic focusing field. Slight displacement of the effective magnetic lens primarily causes the position of the raster to move on the cathode-ray tube face with only a negligible effect on the focus. In this manner, the green image may be brought into exact register with blue and red images projected by the other cathode-ray tubes while remaining in focus.

From the foregoing description it will be apparent that color-reproducing apparatus constructed in accordance with the invention has the advantage that adjustment of the register of component color images displayed on the display screen is facilitated.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In apparatus for displaying in register images developed by a plurality of cathode-ray tubes, an image-reproducing device comprising: a cathode-ray tube having an associated magnetic cathode-ray beam-focus unit and associated beam-deflection means for developing an image on the tube face; and a pair of magnetic shunts disposed along nonopposite axes of said focus unit and displaceable for adjusting the reluctance of said beam-focus unit along said axes to control the positioning of said image 2. In a color-television receiver including color-image-reproducing apparatus for display in register component color images developed by a plurality of cathode-ray tubes, an image-reproducing device comprising: a cathode-ray tube having an associated magnetic substantially cylindrical cathode-ray beam-focus unit and associated beam-deflection means for developing an image raster on the tube face; and a pair of magnetic shunts disposed along nonopposite longitudinal axes spaced by approximately 90° along the periphery of said focus unit and displaceable for adjusting the reluctance of said beam-focus unit along said axes to control the positioning of said image raster in two dimensions.

3. In a color-television receiver including color-image-reproducing apparatus for displaying in register component color images developed by a plurality of cathode-ray tubes, an image-reproducing device comprising: a cathode-ray tube having an associated magnetic cathode-ray beam-focus unit having an outer magnetic shield with longitudinal high-reluctance paths therein and having associated beam-deflection means for developing an image raster on the tube face; and a pair of low-reluctance magnetic shunts disposed along a pair of said paths at nonopposite axes of said focus unit and longitudinally slidable therealong for adjusting the reluctance of said beam-focus unit along said paths to control the positioning of said image raster.

4. In a color-television receiver including color-image-reproducing apparatus of the projection type for displaying in register component color images on a screen developed by a plurality of cathode-ray tubes, an image-reproducing device comprising: a cathode-ray tube having an associated magnetic substantially cylindrical beam-focus unit having an outer magnetic substantially cylindrical shield with longitudinal high-reluctance paths therein and having associated beam-deflection means for developing an image raster on the tube face; and a pair of low-reluctance magnetic shunts disposed along a pair of said paths at longitudinal axes spaced by approximately 90° along the periphery of said focus unit and longitudinally slidable therealong for adjusting the reluctance of said beam focus unit along said paths to control the positioning of said image raster in two dimensions.

5. A magnetic beam-focus unit adjustable for positioning the image raster of a cathode-ray tube comprising: means for developing a magnetic field having an outer magnetic shield with longitudinal high-reluctance paths therein; and a pair of low-reluctance magnetic shunts disposed along a pair of said paths at nonopposite axes of said unit and longitudinally slidable therealong for adjusting the reluctance of said beam-focus unit along said paths to alter said magnetic field in two dimensions.

References Cited in the file of this patent

UNITED STATES PATENTS

| | | |
|---|---|---|
| 2,157,182 | Maloff | May 9, 1939 |
| 2,418,487 | Sproul | Apr. 8, 1947 |
| 2,442,975 | Grundmann | June 8, 1948 |
| 2,500,623 | Babbs | Mar. 14, 1950 |
| 2,541,446 | Trott | Feb. 13, 1951 |
| 2,545,420 | Sziklai | Mar. 31, 1951 |
| 2,707,246 | Zuerker | Apr. 26, 1955 |
| 2,729,759 | Kratz et al. | Jan. 3, 1956 |
| 2,743,389 | Giuffrida | Apr. 24, 1956 |